Oct. 8, 1968 J. T. NEISWINTER ET AL 3,405,236

TRANSISTORIZED FSK TELEGRAPH DRIVER

Filed Sept. 3, 1965 2 Sheets-Sheet 1

INVENTORS
JAMES T. NEISWINTER
CARL N. PEDERSON

BY Strauch, Nolan, Neale, Nies and Bronaugh
ATTORNEYS

Oct. 8, 1968 J. T. NEISWINTER ET AL 3,405,236

TRANSISTORIZED FSK TELEGRAPH DRIVER

Filed Sept. 3, 1965 2 Sheets-Sheet 2

INVENTORS

JAMES T. NEISWINTER
CARL N. PEDERSON

BY

Strauch, Nolan, Neale, Nies and Bronaugh
ATTORNEYS

United States Patent Office 3,405,236 Patented Oct. 8, 1968

3,405,236

TRANSISTORIZED FSK TELEGRAPH DRIVER

James T. Neiswinter, Garden City, N.Y., and Carl N. Pederson, Westmont, Ill., assignors to Pioneer Electric & Research Corporation, Forest Park, Ill., a corporation of Illinois Filed Sept. 3, 1965, Ser. No. 484,882
18 Claims. (Cl. 178—88)

ABSTRACT OF THE DISCLOSURE

A loop or hub driver in the terminal equipment of a telegraph system in which a carrier is shifted above and below a nominal mid-band frequency to form mark and space signals. The driver is transistorized and is compatible with older terminal equipment of the vacuum tube type to provide power savings and lower heat generation, while yielding improved transmission characteristics to handle signals at a faster keying rate for higher information density at lower carrier frequencies. A Space Hold feature enables the carrier channel to present a steady spacing condition to its receive hub under conditions of too low carrier level. The hub driver unit is provided with a Return Space feature, enabling the receive hub, under conditions of an activated space hold condition, to transmit back a space over the carrier terminal duplex to cue the originator that his signal is being blocked. A simulated low signal level can be introduced to check the operation of the space hold feature.

The present invention relates to telegraph systems of the type in which intelligence is transmitted by shifting the carrier above and below a nominal mid-band frequency to form mark and space signals respectively, and more particularly, it relates to an improved loop or hub driver in the terminal equipment which comprises a transistorized circuit that may be inserted in the sockets for the replaced vacuum tubes in the chassis of existing equipment.

In addition to providing power savings and lower heat generation resulting from elimination of 7.2 watts of filament power for the vacuum tubes replaced by the circuit of the present invention, it is a principal object of this invention to provide a transistorized driver stage having improved transmission characteristics and at the same time providing a choice of loop current magnitude of either 20 or 62.5 ma. The transistorized circuit is adapted for direct substitution into the prior vacuum tube circuit with no change in chassis wiring, and is positioned in a housing having socket bases which fit into the sockets vacated by the replaced vacuum tubes.

Another major object of the invention resides in providing a novel space hold feature, whereby the D-C loop reverts to a steady spacing condition when the received signal decreases a predetermined number of decibels below the normal input power level. Where a hub repeater is used, the space hold feature also makes possible the transmission back to the sending transmitter of a steady spacing signal to indicate the presence of a weak signal at the repeater station so that the operator can take the necessary corrective measures. This feature is characterized by use of a circuit which is responsive to the amplitude of the carrier signal and which may provide a voltage level that causes a steady spacing condition of the driver to obtain.

These and other objects of the invention will become more fully apparent from the claims, and from the decription as it proceeds in connection with the appended drawings wherein:

Figure 1:
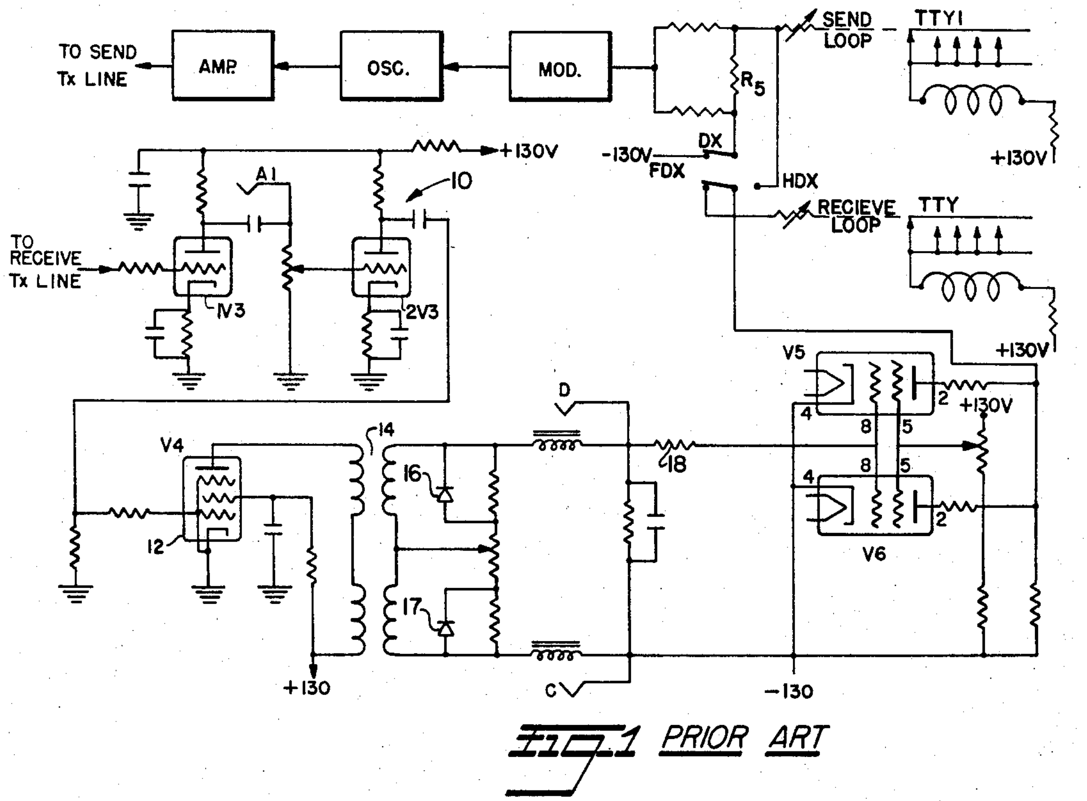
FIG. 1 PRIOR ART
FIGURE 1 is a block diagram of the terminal circuit used in prior terminal equipment but showing the detailed circuit for the vacuum tubes in the loop driver stage that are replaced by the present invention.
Figure 3:
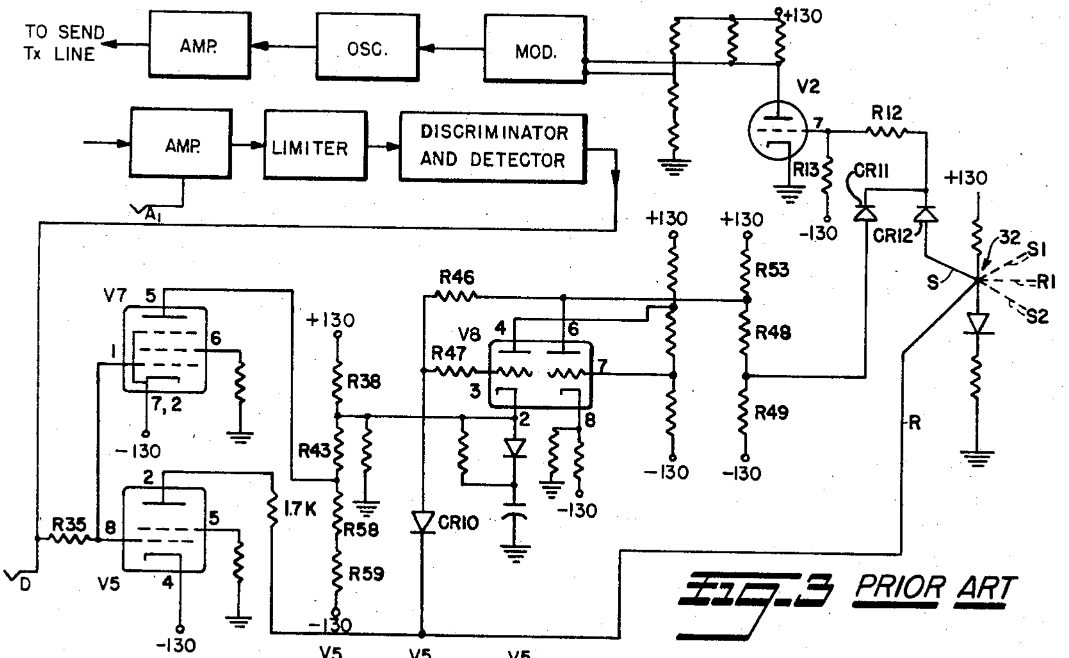
FIG. 3 PRIOR ART
Figure 4:
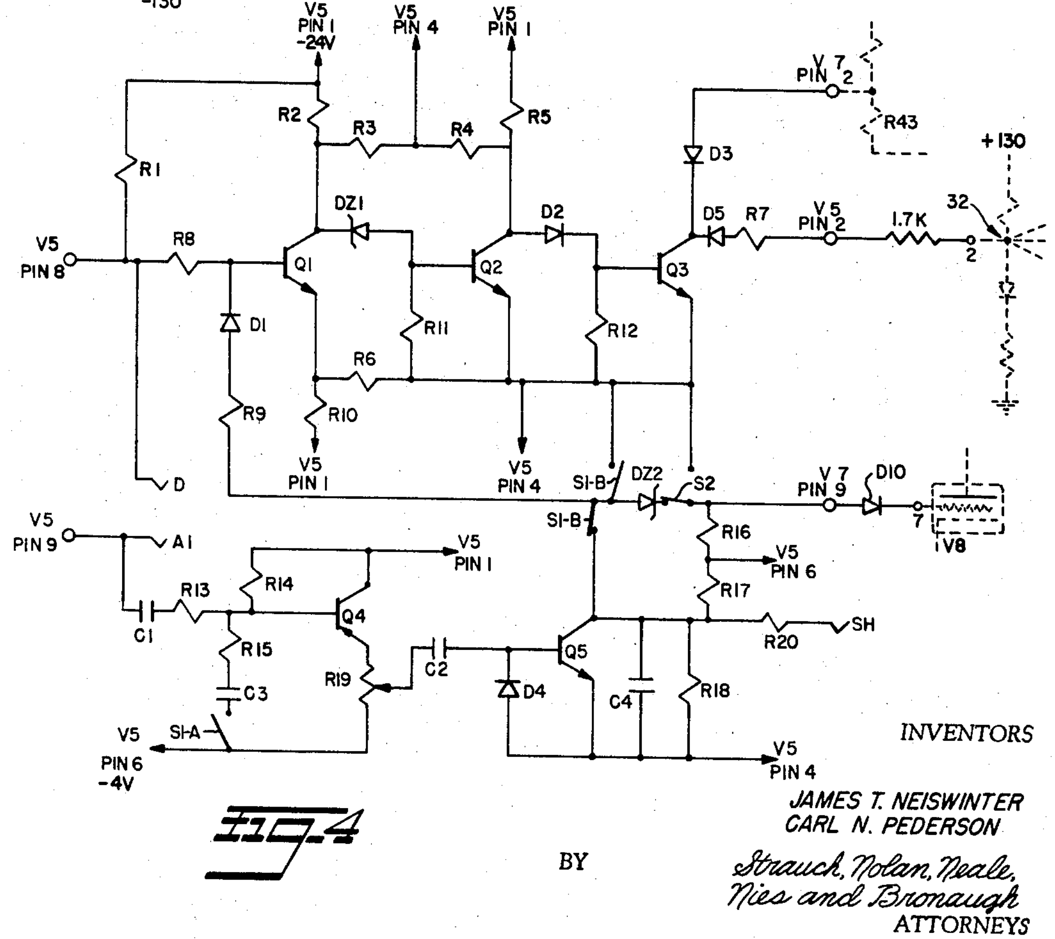

FIGURE 3 is a block diagram of a prior hub circuit similar to the circuit of FIGURE 1, but having the driver output connected for a hub operation; and FIGURE 4 is a circuit diagram of a transistorized circuit also in accord with the present invention which is mounted in a housing having socket plugs that fit into the vacated sockets from which the driver tubes in the circuit of FIGURE 3 are removed.

Referring now to the drawings, the circuit illustrated in FIGURE 1 is part of a telegraph system described in the Bell System Practices, Section E 44.261, dated November 1952, and designated the 43A1 Carrier Telegraph Terminal. This system is a frequency shift system with the mark and space signals being formed by shifting the carrier frequency between values which are 35 to 50 cycles above and below the nominal mid-band frequency of a channel. The A-C circuits of the basic channel terminal unit are all the same for all channels. The operating frequencies of a particular channel terminal are determined by two plug-in frequency determining units, one for the sending side and one for the receiving side.

In a frequency shift system, the marks consist of periods of carrier of a particular frequency and the spaces of similar periods of a second frequency. During signal transmission periods the magnitude of the current on the carrier line is thus constant whether marking or spacing and only the frequency changes. Means sensitive to the frequency changes distinguishes between the marking and spacing elements of the signals.

With reference now to FIGURE 1, the input signal to the receiver is applied to a two-stage amplifier 10, the output of which is applied to a limiter stage 12, a discriminator 14 and detectors 16 and 17. Jack A–1 is connected in the output circuit of the first amplifier stage and will be used for a purpose to be described below.

The output signal from detector rectifiers 16 and 17 is applied to the control grids of D-C driver tubes V5 and V6 of the illustrated circuit which is shown connected by double pole, double throw switch DX for full duplex operation, designated the FDX switch position, with ±130 volt loops over a 4-wire facility, such that transmission from sending keyboard TTY1 is entirely separate from transmission to receiving teletypewriter TTY.

The output of limiter stage 12 is passed through the primary side of discriminator 14. The discriminator structure may consist of two anti-resonant circuits in series which are tuned respectively, such that when a signal of somewhat lower frequency than the low frequency signal is received, the voltage across detector 16 is considerably higher than the voltage across detector 17. Conversely, when a signal of a somewhat higher frequency than the high frequency signal is received the reverse is true.

When the lower frequency is received, pin jack D is positive with respect to pin jack C, making the grid of tube V5 positive with respect to its cathode, causing tube V5 to conduct and produce a marking current in the receiving loop.

Reception of the higher frequency causes pin jack D to become negative with respect to pin jack C, making the grid of tube V5 negative with respect to its cathode. This causes current conduction in tube V5 to be cut off, producing an open or spacing condition in the receiving loop. Tubes V5 and V6 are of the beam-power 429A type and are connected in parallel to produce 60 milliamperes of current in the receive loop.

Tubes V5 and V6 function together as a switch the closing of which is controlled by the application of positive signals at jack D with respect to jack C and whose opening is effected by the inverse condition. Thus, with the reception of marking signals, tubes V5 and V6 conduct operating receiving teletypewriter TTY to marking through the receive loop. Spacing signals cause tubes V5 and V6 to cease conducting, opening the receiving loop, thus causing the teletypewriter to receive a spacing signal.

Figure 2:
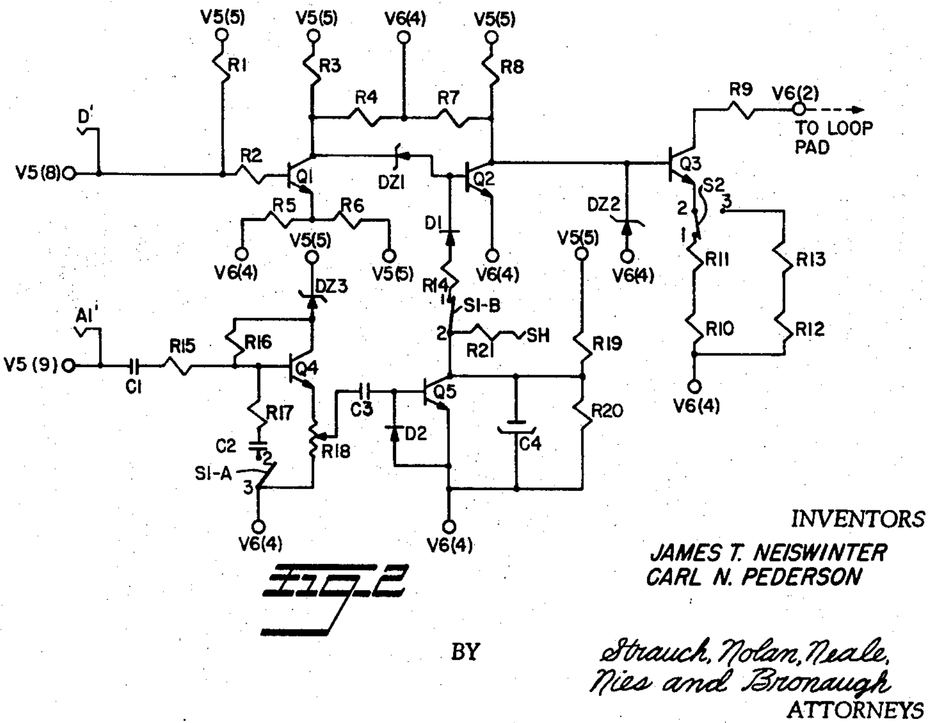
FIGURE 2 is a circuit diagram of the transistorized circuit of the present invention which is mounted in a housing having socket plugs that fit into the vacated sockets of the replaced driver tubes in the circuit of FIGURE 1.

FIGURE 2 is a circuit diagram of the transistorized driver unit and is basically a transistorized electronic binary switch. This unit is adapted to replace the circuitry of the two beam-power 429A vacuum tubes V5 and V6 in FIGURE 1. In addition to establishing improved loop driving characteristics, the transistorized circuit of FIGURE 2 also provides a positive space hold feature which will be described below.

The circuit of FIGURE 2 may be formed on a printed-circuit board which can be enclosed within a protective housing of such size as to fit on the chassis which contains the circuit of FIGURE 1. On the bottom surface of the printed-circuit board, are two 9-pin plug assemblies positioned and oriented to engage the tube sockets for vacuum tubes V5 and V6. Thus, in FIGURE 2, the various terminals to which operating power and signal voltages are connected refer to the terminal pins of the tube sockets for vacuum tubes V5 and V6 of FIGURE 1.

Extending from one end of the loop driver housing for the circuit of FIGURE 2, are two pigtail leads labeled A1 and D. These terminate in insulated phone tips to engage corresponding tip jacks A1 and D in the circuit of FIGURE 1.

The circuit of FIGURE 2 comprises two signal channels, one the loop driver and the other the "space hold" or carrier signal amplitude sensitive circuit. The loop driver circuit consists of a three-stage transistor amplifier composed of transistors Q1, Q2 and Q3. The input signal is derived from the existing grid connection of the replaced 429A tube V5. A one-megohm resistor 18 (see FIGURE 1) in series with terminal 8 of V5 is effectively eliminated when pigtail lead with phone tip jack D is inserted in the D jack of the chassis. Such shorting of the one-megohm resistor does not degrade the characteristics of the discriminator.

Resistor R1 (300K ohms) is connected to the positive 130 volt potential with respect to the midpoint of the discriminator. This resistor tends to improve the dynamic balance of the discriminator for higher speed signals containing a series of single-band transitions. It also raises the zero-signal D-C voltage measured between the C jack and D jack to approximately 15 volts. Resistor R2 (240K ohms) in series with the base of the first transistor Q1 in the driver chain limits the current load on the discriminator to an acceptable level.

Resistors 5 and 6 (4.7K ohms and 33K ohms respectively) form a voltage divider across 130 volts. At their junction a potential of 16 volts is developed and applied to the emitter of transistor Q1. Therefore, with no signal from the discriminator, transistor Q1 essentially is floating, being neither driven nor cut off. The collector load of transistor Q1 comprises resistors R3 and R4 (270K ohms and 120K ohms) also spanning 130 volts. This combination provides a collector voltage of 40 volts through an effective resistance of 83K ohms.

A marking tone received through the channel creates a positive voltage at the base of transistor Q1 with respect to its emitter. This voltage is sufficient to cause transistor Q1 to be driven into full conduction. The collector voltage at this time equals the 16 volts appearing at the emitter.

A spacing tone received generates a negative potential at the base of Q1, causing Q1 to cease conducting. Its collector thus arises to approach the 40 volt applied voltage. This maximum is not reached, however, because the second-stage loading on transistor Q2 limits the level to approximately 20 volts.

Zener diode DZ1, a 20 volt breakdown device, couples the collector of transistor Q1 to the base of transistor Q2. Diode DZ1 serves as a voltage subtractor, deducting its value of breakdown voltage from the total voltage supplied, which in this case is 40 volts, leaving a remainder of 20 volts applied as a forward bias to transistor Q2. The emitter of transistor Q2 is held at a reference level. Transistor Q2 conducts heavily when a spacing tone is received. However, when the Zener 20 volts are deducted from a 16 volt marking potential at the collector of transistor Q1, the base of transistor Q2 is deprived of all drive current and transistor Q2 therefore ceases to conduct.

Resistors R7 and R8 (4.7K ohms and 33K ohms respectively) are connected across 130 volts and comprise the collector load for transistor Q2. This combination provides 16 volts through an effective source resistance of 4.1K ohms.

The function of transistor Q3 is to control and key the loop current at the desired level of 62.5 ma. Omitting for the moment the presence of the 6.8 volt Zener diode DZ2 in the circuit, the available forward drive to the base of transistor Q3 acting through the minimum current transfer ratio of this transistor is capable of forcing a collector current into the loop circuit in excess of 75 ma. The emitter resistors R10 and R11, are selected to about 100 ohms and are in the circuit when the loop current switch S2 is in the illustrated 62.5 ma. position. The voltage drop across resistors R10 and R11 ordinarily would be somewhat in excess of 7.5 volts for a 75 ma. loop current. However, when Zener diode DZ2 is connected into the base circuit of transistor Q3, the maximum drive voltage to the base is limited to only 6.8 volts. Therefore, it is not possible to drive the full 75 ma. in the loop. Instead, a balance is achieved between the emitter voltage due to loop current through resistors R10 and R11 and the 6.8 volt Zener diode drop of DZ2. This balance is controlled by a value selection of resistor R11 which, when added to the resistance of resistor R10, pegs the loop current at 62.5 ma. on a controlled basis.

Series resistors R12 and R13 are switched into the emitter circuit of transistor Q3 in lieu of resistors R10 and R11 when it is desired to operate with a 20 ma. loop current. This switching action is accomplished by closing the circuit between terminals 2 and 3 and opening the circuit between terminals 1 and 2 via slide switch S2.

Resistor R9 is a 470 ohm, 5 watt component inserted to absorb about one half of the power released in the drive circuit. This resistor protects transistor Q3 from excessive power dissipation. The output signal appears on pin 2 of the tube socket V6 as in the case when the prior vacuum tubes were used.

The space hold portion of the circuit of FIGURE 2 derives its input signal from the A1 jack (FIG. 1) of the carrier terminal. This signal is at the carrier frequency and its amplitude is proportional to the input signal amplitude coming from the communications channel. The signal is coupled through the D-C blocking capacitor C1, a 0.0047 mfd., 200 volt capacitor, and through a 680K ohm load-limiting and isolation resistor R15 to the base of transistor Q4. The one-megohm resistor R16 also connects to the base of transistor Q4 from 30 volts. It provides forward bias to the base.

The transistor may be a 2N697 NPN silicon device used as an emitter follower. The collector connects directly to +30 volts. This voltage is obtained from +130 volts with Zener diode DZ3 serving to subtract 100 volts, leaving 30 volts for application to the collector.

The emitter of transistor Q4 is in series with a multiturn 10K potentiometer R18 to the reference voltage. The input signal derived from the A1 jack is diminished somewhat by the voltage division between R15 and R16.

However, sufficient signal appears across potentiometer R18, but from a much lower source impedance. The arm of potentiometer R18 connects to the base of transistor Q5, a 2N697 silicon NPN device, through the coupling capacitor C3 (0.22 mfd., 200 volts).

The A-C signal which is impressed on the base of transistor Q5 causes Q5 to conduct for the positive portions of the carrier signal cycle. Diode D2, connected between the base and emitter of transistor Q5, and polarized in opposition to its base-emitter junction, allows capacitor C3 to be reset on each negative half cycle of the carrier frequency wave form. The emitter of transistor Q5 connects to the reference voltage and its collector derives a positive 30 volts with respect to its emitter through an effective 36K ohms source resistance. Resistors R19 (160K ohms) and R20 (47K ohms), connected across 130 volts, provide this collector load and voltage.

The signal-current pulsating at the carrier frequency causes the voltage appearing at the collector of transistor Q5 to vary between the reference potential during the conduction portion of the carrier cycle, and +30 volts for the nonconducting portion. Capacitor C4 (4.7 mfd., 35 volt tantalum unit), connected between the collector of Q5 and its emitter, acts as a filter for the pulsating collector voltage. During the time when transistor Q5 is conducting, this capacitor has a very low time constant discharge path to the reference point. During each half cycle when transistor Q5 cuts off and the voltage at its collector attempts to reach +30 volts, capacitor C4 cannot recharge appreciably through the effective 36K ohms source resistance. Therefore, the potential which appears at the collector of Q5 remains substantially at the reference voltage.

Should the input signal at the A1 jack disappear, there would be no drive to transistor Q5 and in a few milliseconds the voltage at its collector would rise to +30 volts. This action does not require that there be a complete absence of signal at the base of transistor Q5. Some departure of the collector voltage from reference will occur when the drive presented to the base is reduced to the point where the emitter-collector conductance, with capacitor C4, results in a RC time constant longer than that controlling the capacitor's charging interval. Because of the foregoing action, and also because the amplitude of signal presented through C3 to the base of transistor Q5 is adjustable by means of the control on potentiometer R18, an input signal reduction of approximately 3 db results in the complete 30 volt change possible for the collector potential of transistor Q5.

The carrier-signal-controlled D-C voltage at the collector of the Q5 is applied to the base of transistor Q2 through the closed contacts SB1 of the space hold switch (S.H. SW.) in its NORMAL position, then through resistor R14 (100 ohms) and the forward-biased diode D1. As long as the voltage at the collector of transistor Q5 remains below the emitter voltage of transistor Q2 there exists no interference with the stream of signals or a marking signal passing through the loop driver portion of the unit. However, should the channel carrier signal level decrease below the predetermined point set for space hold (the point where the voltage at the collector of Q5 rises positively from the reference potential), transistor Q2 becomes locked into conduction. It then cannot be cut off by signal traffic or a marking tone arriving from the discriminator through transistor Q1. Transistor Q3 locks into a nonconducting state, and this action results in the steady space hold condition for the loop.

Switch S1 has two sets of contacts S1–B and S1–A and is illustrated in the NORMAL position. When it is desired to test or calibrate the setting of the space hold circuit, switch S1 is transferred to its alternate position which opens contacts S1–B and thus disconnects the space hold circuit from the loop driver circuit portion. Contacts S1–A close to add resistor R17 (56K ohms) and capacitor C2 (.01 mfd., 200 volts) to the circuit connected to the base of transistor Q4. This has the effect of inserting a calibrated 15 db loss into the circuit. Connecting a D-C voltmeter between tip jack SH and tip jack C (FIG. 1) permits a convenient and positive check while adjusting or monitoring the sensitivity of the space hold feature without disturbing normal channel operation.

FIGURE 3 shows the 43A1 system connected to what may be termed a hub circuit 32. Connection of 43A terminal equipment to a "hub" permits transmission of intelligence to and from other channels which are interconnected to the hub. A signal received at a hub from a voice frequency channel is transmitted simultaneously to all the channels interconnected to the hub. Such connection requires that the terminal equipment circuit of FIG. 1 be modified by replacing tube V6 with tubes V7 and V8 as shown in FIG. 3. This converts the D-C output equipment of FIG. 1 from a "loop driver" to a "hub driver" to convert received voice frequency intelligence to coded pulse signals for sending to a hub.

Tube V5 transmits incoming signals from the carrier channel to the receiving hub. A mark from detectors 16, 17 makes the grid of tube V5 more negative than its cathode, cutting off the tube during received marks. A space signal from the carrier channel is applied by the detectors to the grid of tube V5 driving the tube to conduct.

The circuit of FIG. 3 is shown connected for half-duplex hub operation with the send S and receive R leads of the channel terminal connected to one hub 32. The hub 32 operates with +60 volts for mark and −30 volts for space. The circuits of tubes V7 and V8 control the direction of signal transmissions from and to the hub as will be described below.

The directional control circuit of FIG. 3 prevents the channel when sending a space signal into hub 32 (over lead R) from having the same signal sent back to its sending equipment over lead S. However, when any other channel connected to hub 32, such as by leads S1, R1, S2 sends a space into the hub, that space is sent through over lead S to the sending side of the channel. Under conditions where the channel is sending spaces to hub 32 simultaneously with another interconnected channel, the directional control circuit causes spaces to go out on all of the sending leads S, S1, S2 from the hub to the terminal equipment, including the channels which are sending the spaces into the hub.

The heart of the directional control circuit is the flip-flop tube V8 which, through the interconnecting circuit, automatically conditions the sending side of the channel at send lead S to either receive or not receive, as required, spaces from hub 32. The conducting or nonconducting condition of the left half of tube V8 is controlled by its grid-to-cathode potential. The potential at cathode 2 is controlled by the signal received from the channel terminal and is +20 volts for a mark and −45 volts for a space. The potential of grid 3 of tube V8 is controlled by the potentials appearing at both sides of varistor CR10 and whether they act in the forward or backward direction of the varistor, as will be explained.

Whenever the left half of tube V8 conducts, its right half is cut off and vice versa in flip-flop fashion. Under conditions where the left half of tube V8 is in nonconducting condition, the directional control circuit permits marks and spaces to flow freely from the hub 32 to the send portion of the channel over lead. When the left half of the tube conducts the control circuit hold lead S marking, preventing spaces from being received from the hub 32.

To illustrate, assume a mark signal received over the channel and also over another channel interconnected to hub 32. Under such conditions tube V5 is cut off, while the hub voltage is at +60 volts. Tube V7 is also cut off, its grid and cathode being connected parallel with the grid and cathode of tube V5.

Cathode 2 of flip-flop tube V8 is kept at about +20 volts by voltage divider comprising R38, R43, R58 and R59. +130 volts is connected through R53 and R46 to one side of varistor CR10, while its lower side is connected to hub 32 at +60 volts. A voltage is thus applied to CR10 in its forward direction, causing its resistance to be low and the actual voltage at its upper side to be about +60 volts. The +60 volts act on grid 3 of tube V8 through grid leak resistor R47, causing the left side of tube V8 to conduct, and maintain its right side cut off. Plate 6 of tube V8 is at approximately +130 volts. This produces a potential of about +60 volts at the junction of resistors R48 and R49.

This +60 volt potential acts through varistor CR11 in its forward direction, and with the +60 volts of the hub effective through varistor CR12 in its forward direction (—130 volts appearing through resistors R12 and R13 at the other side of these varistors) makes both of these varistors of low impedance. The effective voltage on grid 7 of tube V2 is about +40 volts, causing the tube to conduct and transmit a marking signal to the carrier.

Next assume a space from the channel and a mark from another interconnected channel, say over lead R1. Under such conditions, tubes V5 and V7 conduct, 30 ma. plate current flowing over lead R. Hub 32 is at —30 volts, sending a space over leads S1, S2. The potential of cathode 2 of tube V8 is at about —45 volts. The potential across CR10 is forward acting, causing its resistance to be low and the potential at grid 3 of tube V8 to be about —30 volts. With grid 3 of tube V8 positive with respect to its cathode 2, the left side of tube V8 conducts, while its right side is cut off.

At the junction of resistors R48 and R49, a +60 volts act through CR11 in the forward direction causing the junction of CR11 and CR12 to be approximately +60 volts. This places grid 7 of tube V2 to be at about +40 volts, causing the tube to conduct and send a mark to the carrier channel. The high backward direction resistance of varistor CR12 prevents the spacing voltage of —30 volts on hub 32 from getting through to the grid 7 of tube V2. A "Hold Mark" condition on the sending side of the channel is thus maintained, while a space is received from the receiving side of the channel.

Now assume a mark from the channel and a space from another interconnected channel, say over lead R1. Under such conditions, the space over lead R1 causes a hub potential of —30 volts. With a mark being received, tubes V5 and V7 are cut off, and cathode 2 of V8 is at +20 volts. The hub potential of —30 volts appears at grid 3 of tube V8, causing the left half of the tube to be cut off while its right half conducts. At plate 6 of tube V8 approximately zero potential appears, giving about —30 volts at the junction of resistors R48 and R49. This causes forward potentials across both varistors CR11 and CR12 in their forward directions (there being —30 volts on one side and —130 volts, through resistors R13 and R12, on the other). A potential of about —40 volts appears at grid 7 of tube V2, causing the tube to cut off and send a space to the carrier line of the channel.

Next, assume a mark from the channel while another interconnected channel sends marks and spaces, say over lead R1. Under these conditions the receiving side of the channel continuously marks while the other channel is sending to hub 32. The left half of tube V8 is maintained cut off; the directional control circuit permitting the flow of either marks or spaces from hub 32 to the send side of the channel over lead S. The same sequence as outlined immediately above is followed; the next succeeding mark over lead R1 makes the hub potential +60 volts. The right half of tube V8 is conducting and the potential of plate 6 is near zero. These potentials act on varistor CR10 in its backward direction to make its resistance high, preventing the +60 volts over lead R from being applied to grid 3 of tube V8. Grid 3 remains at about zero volts. With +20 volts at the cathode 2 of tube V8, its left half remains cut off. As in previously discussed assumed conditions, under this condition —30 volts appears at the junction of resistors R48 and R49 and free transmission of either marks and spaces is permitted from the hub to the send side of the channel over lead S. Now assume the reception of a space from the channel and also from another hub interconnected channel, say over lead R1. With spaces being sent to hub 32 simultaneously over leads R and R1, the hub voltage becomes —60 volts and is termed a "double space" condition. Lead R places —60 volts at the lower side of varistor CR10, causing the potential to act in its forward direction so that its resistance is low. The voltage at grid 3 is almost that of the lead R and is negative with respect to cathode 2. Thus, the left half of tube V8 is cut off for marks and spaces coming in from the receiving side of the channel, but its sending side may receive a space from the hub 32.

The transistorized circuit of FIGURE 4 replaces the two beam-power 429A vacuum tubes, V5 and V7, in FIGURE 3. In addition to providing obvious advantages such as the elimination of filament power requirements of the replaced tubes, and the resulting decrease in heat generation, the circuit of FIGURE 4 establishes a better output wave-form characteristic for the hub, especially at the lower carrier frequencies. A channel so equipped also can handle signals at faster keying rates which means that the 43A1 terminal can be used for higher information density signals on the lower carrier frequencies.

The space hold feature as described in the circuit of FIGURE 2 is also incorporated into the circuit of FIGURE 4. This enables the carrier channel to present a steady spacing condition to the receive hub when the input carrier signal level decreases a predetermined number of db below normal signal level. A further feature of the circuit of FIGURE 4 not present in the circuit of FIGURE 2 is the return space circuit. This arrangement reaches into the 43A1 carrier channel's duplex control and causes a space to be transmitted back from the receive hub, as a result of an activated space hold condition. The purpose of the feature is to cue the originator of the signals that he is being blocked from getting his information to the receiver. As with the space hold feature, a disabling switch is provided so that the return space feature need not be used when it serves no express purpose or is not applicable, i.e., in full-duplex applications.

The circuit of FIGURE 4 is constructed on a printed-circuit board, enclosed within a housing 3 inches long by 1⁷⁄₁₆ inches wide, by 2 inches high. The base of the housing is fitted with two nine-pin plugs located and oriented for plugging the unit into the two existing sockets normally intended for tubes V5 and V7 on the 43A1 carrier terminal chassis.

Two pigtail leads terminating in phone tips, one marked D and the other A1, are provided and connected as described in connection with FIGURE 2. The D lead is in the signal channel hub driver; the A1 lead is in the space hold circuit. On the outer surface of the housing are three tip jacks and a multi-turn potentiometer control. Two of the jacks are duplicate extensions of the carrier terminal's D and A1 jacks. The other jack, labeled (S.H.) provides a measurement point for the space hold adjustment and check of performance. The control, labeled S.H. ADJ, sets the threshold of input signal level at which the space hold override becomes effective.

The use of the two pigtail leads obviates need for making any wiring or mechanical changes within the standard 43A1 figure-W carrier terminal chassis. The only resetting required for the terminal, other than a bias adjustment, is readjusting the series filament rheostat to restore the 20-volt level specified for the remaining tube filaments.

The return space feature of the hub driver requires that a 200-volt diode D10 be connected between pin 9 of the V7 tube socket and pin 7 of the V8 socket on the circuit of FIGURE 3. The inclusion of diode D10 does not preclude the use or affect the operation of the 429A tubes should they be restored in place of the circuit of FIGURE 4. Moreover, the presence of the diode does not impair normal operation of the duplex control circuit within the channel.

The hub driver portion of the circuit of FIGURE 4 consists of a three-transistor D-C amplifier. This amplifier receives its input signal from pin 8 of the V5 socket. This is the same input which originally connected to the signal grid of the V5 tube. The output of the unit appears at pin 2 of socket V5, where it corresponds to the plate connection from the original 429A driver tube.

The input signal to the V5 stage is through a one-megohm resistor R35. This resistor must be eliminated for proper operation of the circuit of FIGURE 4. Since the D jack on the channel is connected to one side of resistor R35, and the grid terminal, i.e., pin 8 of V5, is connected to the other side, the pigtail lead D when plugged into the D jack provides a convenient way to short resistor R35.

Referring now to FIGURE 4, resistor R1, a 300K ohm resistor connected to −24 volts, provides a positive bias to the input circuit from the discriminator, and also balances its response characteristics. Resistor R8, a 220K ohm resistor in series with the input driver circuit to the base of transistor Q1, limits the loading of the discriminator. Transistor Q1, a 2N697 silicon device, has its emitter connected to the junction of a 33K ohm resistor R10 and a 4.7K ohm resistor R6. Resistor R10 connects to −24 volts. Thus the potential appearing at the emitter of transistor Q5 is about −115 volts, closely approximating the no-signal D-C voltage delivered from the discriminator.

The resistor combination R2 and R3, connected from −24 volts to −130 volts, provides a collector voltage for transistor Q1 of −32 volts with respect to the −130 volt bus, through an impedance of 84K ohms. Since a marking tone presents a still more negative potential at the base of NPN transistor Q1, it is in the non-conducting state and its collector voltage equals the previously stated virtual source potential. Receiving a space tone presents a positive voltage with respect to the emitter potential of transistor Q1, causing it to saturate. The collector current is limited only by its collector load impedance. The collector voltage of transistor Q1 for the spacing condition closely approaches that of the emitter.

Transistor Q2, a NPN 2N697 type, derives its signal from the collector of Q1 through a 20-volt Zener diode DZ1. This diode serves as a voltage subtraction element, adjusting the absolute D-C level of the signal appearing at the base of transistor Q2 with respect to its emitter potential (−130 volts). Resistors R4 and R5 in the collector circuit of transistor Q2 function as do resistors R2 and R3, but in this instance, providing a potential at the collector 15 volts more positive with respect to −130 volts and with a combined impedance of 3K ohms. Diode D2 couples the output of Q2 to the base input of Q3.

Transistor Q3 may be a high-voltage, medium-power silicon NPN device such as an RCA 40264. It is capable of blocking, between emitter and collector, potentials up to 300 volts, and will withstand power dissipation of 4 watts. The emitter of transistor Q3 is connected to −130 volts. Its collector connects through diode D5 and resistor R7, a 560 ohm 3 watt resistor, to terminal 2 of the V5 socket mating plug. Resistor R7 simulates the IR drop across the replaced 429A tube, V5, when conducting to program a space into the receive hub 32. This resistor therefore is necessary for limiting the total driving current to the design value of 30 ma. for spacing. In this application, transistor Q3 must be able to withstand the maximum of 190 volts between its collector and emitter during any period when the receive hub is marking. Since the transistor is either fully conducting (as when a space is being received), or completely cut off for a mark, the amount of heat or energy being generated within its package is negligible. Therefore, the need for handling dissipation of power is not a factor in the unit's design. The transistors and other semiconductors in the unit operate satisfactorily at temperature ambients in excess of 100 degrees centigrade.

There is a second circuit branching from the collector of transistor Q3. This consists of diode D3 to pin 2 of the plug mating with socket V7. This circuit effectively replaces the function of the 429A beam-power tube originally driving the duplex control circuit and the TL lamp indicator (not shown). Diode D3 is required to isolate the hub voltage from the duplex control when the receive hub is being driven from some source other than this particular unit.

The space hold portion of the circuit of FIGURE 4 derives its input signal from the A1 jack of the circuit of FIGURE 3. This signal is at the carrier frequency with its amplitude proportional to the input signal level coming from the communications channel. The signal is coupled through the D-C blocking capacitor C1, a 0.0047 mfd., 200-volt capacitor, and through a 680K ohm load-limiting and isolation resistor R13 to the base of transistor Q4. The one-megohm resistor R14 also connects to the base of transistor Q4 from −24 volts, providing forward bias. Q4 is a 2N3638 PNP silicon device used as an emitter follower. The collector connects directly to −24 volts, while its emitter is in series with a 15-turn 10K ohm potentiometer R19 (S.H. ADJ) to −4 volts. The input signal derived from the A1 jack is diminished somewhat by the voltage-divider action of R13 and R14. However, the signal at that level then appears across the S.H. ADJ potentiometer, but from a much lower source impedance. The arm of the S.H. ADJ potentiometer connects to the base of transistor Q5, a silicon NPN, 2N697 device, through a coupling capacitor C2, 0.22 mfd., 200 volts.

The A-C signal which is impressed on the base-emitter junction of transistor Q5 causes conduction for the positive portions of the carrier signal cycle. Diode D4, connected between the base and emitter of transistor Q5, being polarized in opposition to the voltage across the base-emitter junction, allows capacitor C2 to follow the average charging level at each negative half cycle of the carrier frequency wave form. The emitter of transistor Q5 connects to −130 volts and its collector derives a positive 30 volts with respect to −130 volts through 36K ohms of source resistance. The resistors R17 (150K ohms) and R18 (47K ohms) connected from −4 volts to −130 volts provide this collector load.

The signaling pulse groups of the carrier frequency cause the voltage appearing at the collector of transistor Q5 to vary between −130 volts during the conduction portion of the carrier cycle and −100 volts for the non-conducting portion. Capacitor C4, a 4.7 mfd., 35 volt tantalum unit, connected between the collector of transistor Q5 and −130 volts, acts as a filter for this pulsating collector voltage. During the time when transistor Q5 is conducting, the capacitor has a very short charge time constant to −130 volts. When transistor Q5 cuts off, its voltage at the collector attempts to discharge to −100 volts. However, capacitor C4 now discharging through the source resistance of 36K ohms, cannot appreciably alter its potential in the time of ½ cycle of the carrier frequency. Therefore, the potential which appears at the collector of Q5 remains substantially at −130 volts.

Should the input signal at the A1 jack disappear, there would be no drive to transistor Q5, and in a few milliseconds the voltage at the collector would change to −100 volts. This action does not require that there be a complete void of signal; the rise of the collector potential toward −100 volts from −130 volts commences when the base drive Q5 is reduced sufficiently to allow its internal resistance, with capacitance of capacitor C4 to create an R–C discharge time constant longer than that associated with the charging interval. A reduction of approximately 3 db in signal level within the critical range then results in the full transition of the Q5 collector from −130 to −100 volts. The absolute threshold for this narrow-range transition can be predetermined anywhere within the comparatively much wider input signal level range by the setting of potentiometer R19.

The signal-controlled D-C voltage at the collector of transistor Q5 is connected to the base of transistor Q1 through the closed contacts of S1–B of the space hold test-normal switch, in the normal position, then through resistor R9 (33K ohm), and the forward-biased diode D1. As long as the voltage at the collector of Q5 is below the emitter voltage of transistor Q1 there is no interference with the stream of signals or steady marking signal passing through the hub driver portion of the unit. If this channel signal level should decrease below the set point for space hold, i.e., the point where the voltage at the collector of transistor Q5 rises positively from −130 volts, drive will be presented to transistor Q1 from transistor Q5 when the emitter potential of transistor Q1 is exceeded. Thus the discriminator output cannot cause transistor Q1 to cut off even though the channel is receiving a marking tone. The receive hub then assumes, a definite spacing condition independent of input signal frequency.

It is desirable to be able to evaluate the setting of the space hold circuit while the carrier terminal is on line and carrying traffic. This condition is met through the use of a switch S2 or the S.H. SW test-normal. This switch has a double-pole double-throw contact configuration denoted as S1–A and S1–B. In the normal position contact S1–A is connected with its common contact terminated at −4 volts, and its normally open contact connected to capacitor C3 (0.01 mfd., 200 volt). Capacitor C3 connects in series through a 56K ohm resistor R15 to the base of transistor Q4. In the normal position of switch S1, resistor R15 and capacitor C3 terminate into an open circuit and therefore have no effect on the signal input amplitude to the space hold circuit. However, when switch S1 is placed in the test position, these two components cause a decrease in the signal input voltage, since the −4 volt D-C termination of switch S1–A is effectively at ground for impressed A-C voltages. The value of resistor R15 is chosen to provide an approximate 15 db decrease in signal voltage at the base of transistor Q4. The only function of capacitor C3 is to prevent any change in the D-C bias voltage presented to the base of transistor Q4, and yet act as a short circuit for the carrier frequency.

The second pole S1–B of switch S1 in the normal position as illustrated connects the space hold blocking voltage to the base of transistor Q1 through resistor R9 and diode D1 in series. The common contact of S1–B is connected to the R9 side of this circuit. Therefore, when S1 is placed in the test position which disconnects the space hold blocking voltage to transistor Q1, the common contact of S1 connects to −130 volts. The reason for this termination of S1–B is explained when discussing the next circuit feature. The S.H. jack connecting to the collector of transistor Q5 is intended as a test point to determine the potential there with respect to −130 volts as in the case of the circuit of FIGURE 2.

The return space feature also derives its signal voltage from the collector of transistor Q5 through the normally closed contacts of switch S1–B. The object is to clamp the flip-flop tube V8 of the duplex control circuit of FIGURE 3 in the unblocking mode when the input carrier signal is decreased to a level where the space hold system takes over. The resulting space on the receive hub then programs the sending side of the 43A1 terminal to transmit a space back to the origin of the incoming traffic. Inspection of the operation of the duplex control flip-flop tube V8 reveals that, when signals are originating at the hub, the left hand side of tube V8 is nonconducting while the right hand side of tube V8 is conducting.

The cathode at pin 8 of V8 is pegged at −45 volts; therefore, if a voltage were injected into the grid circuit of this stage, more positive than the cathode potential, the V8 tube would be effectively clamped in the desired mode. The voltage change occurring at the collector of transistor Q5 (FIGURE 4) is in a positive direction and is of sufficient range to accomplish this return space function when a space hold condition exists. This voltage, however, has an incorrect D-C reference with respect to the cathode at pin 2 of tube V8. To remedy this deviation in reference voltage, Zener diode DZ2 and a 330K ohm resistor R16 may be connected from the common terminal of switch S2, to −4 volts at pin 6 of tube socket V5. Zener diode DZ2 breaks down at 68 volts, effectively subtracting this voltage from the −130 to −100 volt signal appearing at switch S2. Therefore, the voltage which is present at the junction of DZ2 and R16 ranges from −62 volts to −32 volts. This control voltage is terminated at pin 9 of the mating plug for the V7 socket.

A 200 volt silicon low-leakage diode D10 may be connected with its anode side to the pin 9 terminal of the tube socket V7, and the cathode side of the grid terminal pin 7 of the V8 tube socket. The control voltage then will be applied to the grid of V8 and override the duplex control to reflect a space. The series blocking diode is required to permit normal operation of the duplex control when the carrier channel level is above the space hold set point. Switch S2, a single-pole double-throw unit labeled return space on-off, provides a means for disabling this override of the duplex control in the off position.

At this point it must be noted that if the return space switch S2 is in its illustrated on position when an attempt to change the setting space hold switch S1 from either normal to test or test to normal, a momentary hit will be generated through the hub driver channel. However, as long as the return space switch S2 is in its off position during the transfer of the space hold switch S1, no detrimental effect occurs.

The invention may therefore be embodied in other specific forms without departing from the spirit or essential characteristics thereof. The present embodiments are therefore to be considered in all respects as illustrative and not restrictive, the source of the invention being indicated by the appended claims rather than by the foregoing description, and all changes which come within the meaning and range of equivalency of the claims are therefore intended to be embraced therein.

What is claimed and desired to be secured by Letters Patent is:

1. In a telegraph signal transmission system where mark and space signals are represented by a shift in carrier frequency above and below a nominal mid-band frequency, a receiver including: an amplifier stage for receiving the incoming signals; a discriminator connected to receive the output signal from said amplifier stage; and a direct current amplifier connected to the output of said discriminator, said direct current amplifier being in a condition of alternatively non-conducting or conducting at a predetermined current level in response to the received signals and comprising a plurality of transistors connected to provide a signal channel with the conduction condition of a last transistor in said signal channel being controlled by a penultimate transistor in said signal channel to either a cut-off or a current conducting condition, and with a further transistor in said signal channel connected directly to the output of said discriminator.

2. The system as defined in claim 1 wherein the direct current amplifier is a telegraph loop driver and said last transistor in said signal channel contains in its current conduction circuit a first resistance means to limit the current when conducting to a first value, a second resistance means to limit the current when conducting to a different value, and a manually settable switch for selecting the desired one of the first or second resistance means in accordance with the current requirements of the telegraph loop; and wherein the last transistor contains in its base circuit a Zener diode to limit the maximum drive voltage from the penultimate transistor output circuit.

3. The system as defined in claim 1 wherein the direct current amplifier is a telegraph hub driver and said last transistor in said signal channel has one terminal connected to a telegraph hub through a circuit including a diode and a current limiting resistance means; and wherein the base of said last transistor is coupled to the output of the penultimate transistor by a circuit including a diode.

4. The system as defined in claim 1 wherein the receiver has a circuit responsive to the amplitude of the incoming signal frequency including means for producing a unique voltage level in response to reception of signals below a predetermined amplitude, and circuit means connecting said unique voltage level to control the conduction condition of one of the transistors in said signal channel to thereby cause the direct current amplifier to be maintained in one of its conduction conditions continuously so long as the incoming signals are below said predetermined amplitude.

5. The system as defined in claim 4 wherein the amplitude responsive circuit comprises a first stage having its input connected to receive the output signal from said receiver amplifier stage; and a second stage connected to the output of said first stage and including a capacitor, said capacitor being connected to provide, under conditions when said signal level is below said predetermined amplitude, a discharging rate which is slow relative to its said charging rate under such conditions; and, under conditions where said signal level is at least said predetermined amplitude, to provide a discharging time shorter than the one-half cycle duration of said incoming carrier signal and a charge time longer relative to its said discharging time under the latter higher signal level conditions.

6. The system as defined in claim 5 wherein the direct current amplifier is a telegraph loop driver and the unique voltage level is applied to the base of the penultimate transistor to maintain it continuously in conducting condition and the last transistor in a steady non-conducting condition to thus indicate a continuous spacing condition.

7. The system as defined in claim 5 wherein the direct current amplifier is a telegraph hub driver and the unique voltage level is applied to the base of said further transistor to maintain it and the last transistor continuously in a steady conducting condition to thus indicate a continuous spacing condition.

8. In a telegraph signal transmission system where mark and space signals are represented by a shift in carrier frequency above and below a nominal mid-band frequency, a receiver including: an amplifier stage for receiving the incoming signals; a discriminator connected to receive the output signal from said amplifier stage; a direct current amplifier connected to the output of said discriminator, said direct current amplifier being in a condition of alternatively nonconducting or conducting at a predetermined current level in response to the received signals; and a circuit responsive to the amplitude of the incoming signal frequency including means for producing a unique voltage level in response to reception of signals below a predetermined amplitude, circuit means connecting said unique voltage level to control the conduction condition of said direct current amplifier so that it is maintained in one of its conduction conditions continuously so long as the incoming signals are below said predetermined amplitude, said amplitude responsive circuit comprising first stage having its input connected to receive said output signal from said receiver amplifier stage; and a second stage connected to the output of said first stage and including a capacitor connected to provide, under conditions where said input signal amplitude is at least said predetermined level indicating adequate signal reception, a charging rate which is relatively slow with respect to its discharging rate and with respect to the one-half cycle duration of the applied carrier signal frequency such that said capacitor charges only slightly and is quickly discharged on alternate one-half cycles of said carrier signal maintaining the output of said second stage at below said unique voltage level, and under conditions where said amplitude of said signal is below said predetermined level indicating inadequate signal reception, to charge on alternate one-half cycles of said carrier frequency to above said unique voltage level and discharge relatively slowly with respect to its such charging rate under said latter low signal conditions to maintain an output condition which provides said unique voltage level.

9. The system as defined in claim 8 wherein the direct current amplifier is a telegraph loop driver and the unique voltage level is applied to maintain said direct current amplifier in a steady non-conducting condition to thus indicate a continuous spacing condition.

10. The system as defined in claim 8 wherein the direct current amplifier is a telegraph hub driver and the unique voltage is applied to maintain said direct current amplifier in a steady conducting condition to thus indicate a continuous spacing condition.

11. A transistorized direct current amplifier circuit mounted on a chassis having socket terminals for receiving signal and operating voltages from tube sockets for a vacuum tube direct current amplifier in a receiver connected as part of a telegraph signal transmission system where mark and space signals are represented by a shift in carrier frequency above and below a nominal mid-band frequency, and wherein said receiver includes an amplifier stage for receiving incoming signals, a discriminator connected to receive the output signal from said amplifier stage and said transistorized direct current amplifier is connected to the output of said discriminator; said transistorized direct current amplifier comprising three transistors connected to provide a signal channel with the conduction condition of the last transistor in said signal channel being driven by a penultimate transistor in said signal channel to provide a predetermined output signal and a first transistor in said signal channel connected directly to the output of said discriminator.

12. The direct current amplifier as defined in claim 11 for a telegraph loop driver wherein said last transistor in said signal channel contains in its current conduction circuit a first resistance means to limit the current when conducting to a first value, a second resistance means to limit the current when conducting to a different value, and a manually settable switch for selecting the desired one of the first or second resistance means in accordance with the current requirements of the telegraph loop; and wherein the last transistor contains in its base circuit a Zener diode to limit the maximum drive voltage from the penultimate transistor output circuit.

13. The direct current amplifier as defined in claim 11 for a telegraph hub driver wherein said last transistor in said signal channel has one terminal connected to a telegraph hub through a circuit including a diode and a current limiting resistance means; and wherein the base of said last transistor is coupled to the output of the penultimate transistor by a circuit including a diode.

14. A transistorized circuit mounted on a chassis having socket terminals for receiving signal and operating voltages from tube sockets for a vacuum tube direct current amplifier in a receiver connected as part of a telegraph signal transmission system where mark and space signals are represented by a shift in carrier frequency above and below a nominal mid-band frequency, and wherein said receiver includes an amplifier stage for receiving incoming signals and a discriminator connected to receive the output signal from said amplifier stage; said transistorized circuit containing a direct current amplifier signal channel and an amplitude sensitive circuit responsive to the amplitude of said carrier signal, said signal channel comprising three transistors supplied with operating power through resistor networks connected to the tube sockets, the first of said transistors being connected to the output of said discriminator, the second of said transistors being connected to the output of said first transistor, and the third of said transistors being keyed on and off by the output from said second transistor, and circuit means connected in series with the current conduction path through said third transistor and the tube socket terminals for limiting the current output supplied to the telegraph receiver output terminals; said amplitude sensitive circuit comprising a first transistor stage having its input connected to receive the output signal from said receiver amplifier stage and a potentiometer in its output circuit, an adjustable arm on said potentiometer, and a second transistor stage having its base connected to said potentiometer arm and a capacitor connected to be discharged rapidly with respect to the duration of the half-cycle of the carrier wave to a first voltage level through a circuit including said second transistor during each half-cycle of the incoming carrier wave if the carrier amplitude exceeds a predetermined level and to charge quickly within said half-cycle to a second voltage level if the carrier amplitude is less than said predetermined level; and circuit means connecting the voltage from said capacitor to one of said transistors in said signal channel to cause said third transistor to assume a certain operating condition indicative of a steady spacing condition when the carrier amplitude is less than said predetermined level.

15. The circuit as defined in claim 14 wherein the receiver is connected to drive a telegraph loop circuit and said last mentioned circuit means is connected to the base of the second transistor in said signal channel to cause said second transistor to conduct continuously and the third transistor to remain non-conducting.

16. The circuit as defined in claim 14 wherein the receiver is connected to drive a telegraph hub circuit and said last mentioned circuit means is connected to the base of the first transistor in said signal channel to cause said first and third transistors to conduct continuously.

17. An arrangement as set forth in claim 14 wherein there is provided means responsive to the charging of said capacitor to said predetermined voltage level for conditioning said telegraph equipment for sending a space signal back to the origin of the incoming carrier signal.

18. The arrangement set forth in claim 14 wherein there is provided means selectively actuatable to prevent said voltage from said capacitor from affecting said signal channel and for simulating at said input of said amplitude sensitive circuit a carrier signal of amplitude less than said predetermined level for testing the operability of said amplitude sensitive circuit.

References Cited

UNITED STATES PATENTS

| | | | |
|---|---|---|---|
| 3,037,078 | 5/1962 | Higgins et al. | 178—66 XR |
| 3,172,953 | 3/1965 | Votaw | 178—88 |
| 3,317,670 | 5/1967 | Doktor | 178—88 |

ROBERT L. GRIFFIN, *Primary Examiner.*

J. T. STRATMAN, *Assistant Examiner.*